(12) United States Patent
Li

(10) Patent No.: US 11,780,435 B2
(45) Date of Patent: Oct. 10, 2023

(54) REVERSE ASSIST METHOD AND SYSTEM, IMAGE PROCESSOR AND CORRESPONDING DRIVE ASSIST SYSTEM

(71) Applicant: Black Sesame International Holding Limited, Santa Clara, CA (US)

(72) Inventor: Wenxue Li, Wuhan (CN)

(73) Assignee: Black Sesame Technologies Inc., San Jose, CA (US)

( * ) Notice: Subject to any disclaimer, the term of this patent is extended or adjusted under 35 U.S.C. 154(b) by 512 days.

(21) Appl. No.: 17/068,374

(22) Filed: Oct. 12, 2020

(65) Prior Publication Data

US 2021/0287020 A1 Sep. 16, 2021

(30) Foreign Application Priority Data

Mar. 11, 2020 (CN) .......................... 202010165188.0

(51) Int. Cl.
*B60W 30/095* (2012.01)
*G06V 20/58* (2022.01)

(52) U.S. Cl.
CPC ......... *B60W 30/0956* (2013.01); *G06V 20/58* (2022.01); *G06V 20/586* (2022.01); *B60W 2420/403* (2013.01)

(58) Field of Classification Search
CPC ....... B60W 30/0956; B60W 2420/403; B60W 30/60; B60W 2420/42; B60W 50/14; B60W 40/02; B60W 2050/146; B60W 2420/52; B60W 50/12; B60W 2050/143; B60W 40/06; B60W 30/09; B60W 2720/24; B60W 30/143; B60W 50/06; B60W 30/08; B60W 30/095; G06V 20/58; G06V 20/586; G06V 20/56; G06V 20/588; G06V 10/44; G06V 10/751; G06V 10/96; G06V 10/10; G06V 10/80; G06V 10/225; G06V 10/25; G06V 10/255; G06V 20/52; G06V 20/64;

(Continued)

(56) References Cited

U.S. PATENT DOCUMENTS

2007/0273554 A1* 11/2007 Sakakibara .......... B62D 15/028
                                                             348/148
2009/0079828 A1*  3/2009 Lee ........................... B60R 1/00
                                                             348/148

(Continued)

FOREIGN PATENT DOCUMENTS

CN    108171655 A  *  6/2018
CN    108171655 A     6/2018

*Primary Examiner* — Nimesh Patel
(74) *Attorney, Agent, or Firm* — Timothy Wang; Ni, Wang & Massand, PLLC

(57) ABSTRACT

The present disclosure provides a reverse assist method for a vehicle, comprising: transforming an i-th image in a reversing direction acquired by a camera unit at time $T_i$ into an i-th top plan view, wherein $i \geq 1$; generating an i-th result image based on the i-th top plan view, wherein when i is greater than 1, the i-th top plan view and an intermediate image are spliced to generate an i-th result image; outputting the i-th result image; and wherein the intermediate image is a view transformed from an image of an outside environment in the reversing direction acquired at a time earlier than $T_i$, and the intermediate image is updated according to a predetermined condition during reversing.

17 Claims, 6 Drawing Sheets

(58) Field of Classification Search
CPC .............. G06V 40/103; G06T 3/4038; G06T 2207/30252; G06T 2207/10016; G06T 7/13; G06T 7/20; G06T 11/00; G06T 1/00; G06T 7/70; G06T 3/00; G06T 15/205; G06T 19/00; G06T 2207/30248; G06T 2207/20221; G06T 2207/30261; G06T 5/50; G06T 7/579; G06T 1/0007; G06T 2207/30264; G06T 2207/30241; G06T 7/60; G06T 7/00; G06T 7/74; G08G 1/168; G08G 1/16; G08G 1/14; G08G 1/0962; G08G 1/167; G08G 5/065; B60R 1/00; B60R 2300/607; B60R 2300/105; B60R 2300/806; B60R 2300/303; B60R 2300/305; B60R 2300/302; B60R 11/04; B60R 2300/8086; B60R 2300/102; B60R 2300/20; B60R 2300/802; B60R 2300/30; B60R 2300/304; B60R 2300/8026; B60R 2300/8093; B60R 2300/207; B60R 1/06; B60R 2011/004; B60R 2300/8073; B60R 2300/70; B60R 2300/106; B60R 2300/301; B60R 2300/103; B60R 1/08; B60R 2001/1253; B60R 2300/60; B60R 1/04; B60R 21/0134; B60R 21/34; B60R 19/483; B60R 2011/0082; B60R 2300/804; B60R 2300/8033; B60R 1/23; B60R 2300/202; B60R 25/305; B62D 15/028; B62D 15/027; B62D 15/0275; B62D 15/0285; B62D 15/0295; B62D 13/06; B62D 15/029; B62D 15/021; B60T 2201/10; B60Y 2200/91; B60Y 2200/92; B60Y 2300/06; G05D 1/0223; G05D 2201/0213; G05D 1/0038; G05D 1/0044; G05D 1/0088; G05D 1/0094; G05D 1/024; G05D 1/0274

See application file for complete search history.

(56) References Cited

U.S. PATENT DOCUMENTS

| | | | |
|---|---|---|---|
| 2011/0157361 A1* | 6/2011 | Wu | ................... G06T 3/4038 348/148 |
| 2014/0002660 A1* | 1/2014 | Takahashi | .............. G06V 20/56 348/148 |
| 2014/0063197 A1* | 3/2014 | Yamamoto | ............ G06T 11/001 348/46 |
| 2014/0293001 A1* | 10/2014 | Yu | ............................. B60R 1/00 348/36 |
| 2015/0186733 A1* | 7/2015 | Hayakawa | ............. G06V 20/58 382/103 |
| 2017/0132476 A1* | 5/2017 | Chien | ..................... G06T 5/005 |
| 2018/0265079 A1* | 9/2018 | Nakada | ................ G05D 1/0223 |
| 2019/0005824 A1* | 1/2019 | Hall | ....................... G08G 1/143 |

* cited by examiner

REVERSE ASSIST METHOD AND SYSTEM, IMAGE PROCESSOR AND CORRESPONDING DRIVE ASSIST SYSTEM

CROSS REFERENCE TO RELATED APPLICATION

This patent application claims the benefit and priority of Chinese Patent Application No. CN 202010165188.0 filed on Mar. 11, 2020 with FFDD as the DAS Access code, the disclosure of which is incorporated by reference herein in its entirety as part of the present application.

FIELD OF THE INVENTION

The current disclosure relates to a vehicle drive assist technology, in particular to a reverse assist technology.

BACKGROUND OF THE INVENTION

There are blind areas of vision when parking cars, which is easy to cause accidents. A common solution is to install a wide-angle camera at the rear of the car and transmit the captured images to an in-car display device in real time for the driver to view. However, in this way, the driver cannot know the position of a static obstacle in the blind area in a posterior lateral view of the car or a relative position of the car in the reversing environment. There are also solutions to install four wide-angle cameras on the front, back, left and right sides of the car. Although the above problems can be solved, the hardware cost increases and the memory resource consumption increases.

SUMMARY OF THE INVENTION

In view of this, the current disclosure provides a reverse assist method for a vehicle to solve at least one of the above-mentioned problems.

The reverse assist method for a vehicle according to the current disclosure may include: transforming an i-th image in a reversing direction acquired by a camera unit at time $T_i$ into an i-th top plan view, wherein i≥1; generating an i-th result image based on the i-th top plan view, wherein when i is greater than 1, the i-th top plan view and the intermediate image can be spliced to generate the i-th result image; outputting the i-th result image; and, wherein the intermediate image is a view transformed from an image of an outside environment in the reversing direction acquired at a time earlier than $T_i$, and the intermediate image is updated according to a predetermined condition during reversing. According to this example, the view transformed from the image of the environment in the reversing direction acquired earlier than the current time is spliced into the view at the current time, so that the current result view can include the environment of the place where the vehicle has traveled during reversing. Therefore, it is possible to provide a user with a more comprehensive path image on the reversing path.

For example, in the reverse assist method for a vehicle, the predetermined condition is a movement displacement amount or a predetermined time interval, and updating according to the predetermined condition is to update an intermediate image with a corresponding result image when the predetermined condition is satisfied, that is, to make the result image become the intermediate image. By setting a predetermined condition, the user can be provided with a more comprehensive path image on the reversing path, and the calculation amount is also reduced.

For example, in the reverse assist method for a vehicle, the intermediate image is aligned with the i-th top plan view based on a transformation matrix obtained according to motion information of the vehicle and parameters related to the top plan view. The intermediate image aligned with the i-th top plan view is spliced with the i-th top plan view to generate the i-th result image corresponding to the time $T_i$. The transformation matrix is obtained based on the left and right wheel speeds of the vehicle, the time length between adjacent times, a pixel width of the top plan view image, and an actual physical length displayed by the pixel width of the top plan view.

For example, in the reverse assist method for a vehicle, generating the i-th result image based on the i-th top plan view further includes generating a first result image from the first view when i is equal to 1, and taking the first result image as a first frame intermediate image.

According to another aspect of the current disclosure, it also provides a reverse assist system for a vehicle, which includes: a transformation unit configured to transform an i-th image in a reversing direction acquired by a camera unit at time $T_i$ into an i-th top plan view, wherein i≥1; an image generation unit configured to generate an i-th result image according to the i-th top plan view, wherein when i is greater than 1, the i-th top plan view is spliced with an intermediate image acquired from the storage section to generate the i-th result image; an output unit for outputting the i-th result image; and wherein the intermediate image is a view transformed from an image of an outside environment in the reversing direction acquired at a time earlier than $T_i$; wherein the image generation unit is further configured to update the intermediate image with the corresponding result image when the predetermined condition is satisfied during reversing.

According to yet another aspect of the current disclosure, it also provides an image processor connected to a camera unit to acquire an image from the camera unit, wherein the image processor includes: a processing section configured to receive an i-th image in a vehicle reversing direction acquired by the camera unit at time $T_i$, transforms the acquired i-th image into an i-th top plan view, and generates an i-th result image according to the i-th top plan view; a storage section for storing data required during processing by the processing section; and wherein i≥1 and the processing section is further configured to splice the i-th top plan view and the intermediate image acquired from the storage section to generate the i-th result image when i is greater than 1, and to send the corresponding result image to the storage section to update the stored intermediate image when a predetermined condition is satisfied; wherein the intermediate image is a view transformed from an image of an outside environment in the reversing direction acquired at a time earlier than $T_i$. A monocular camera can be used as the camera unit.

According to yet another aspect of the current disclosure, it also provides a storage medium which stores instructions that when executed by a computer, implements one or more of the reverse assist methods described in accordance with the current disclosure.

According to yet another aspect of the current disclosure, it also provides a drive assist system configured to be capable of executing any of the reverse assist methods for vehicles described herein, or including any of the reverse assist systems described herein, or including any of the image processors described herein.

According to yet another aspect of the current disclosure, it also provides a vehicle capable of executing one or more of the reverse assist methods for the vehicle described herein, or including one or more of the reverse assist systems described herein, or including the image processor described in any one of the applications.

DETAILED DESCRIPTION OF THE INVENTION

In order to make the above objects, features and advantages of the current disclosure more understandable, specific embodiments of the present invention will be described in detail in the following with reference to the accompanying drawings. In the following description, numerous specific details are set forth in order to provide a thorough understanding of the current disclosure. However, the current disclosure can be implemented in many other ways different from those described herein, and those skilled in the art can make similar improvements without departing from the connotation of the current disclosure, so the current disclosure is not limited by the specific implementation disclosed below.

The reverse assist method according to the example of the current disclosure can be applied to a vehicle. The application of the method in a vehicle will be described below with reference to FIG. 1.

Figure 1:
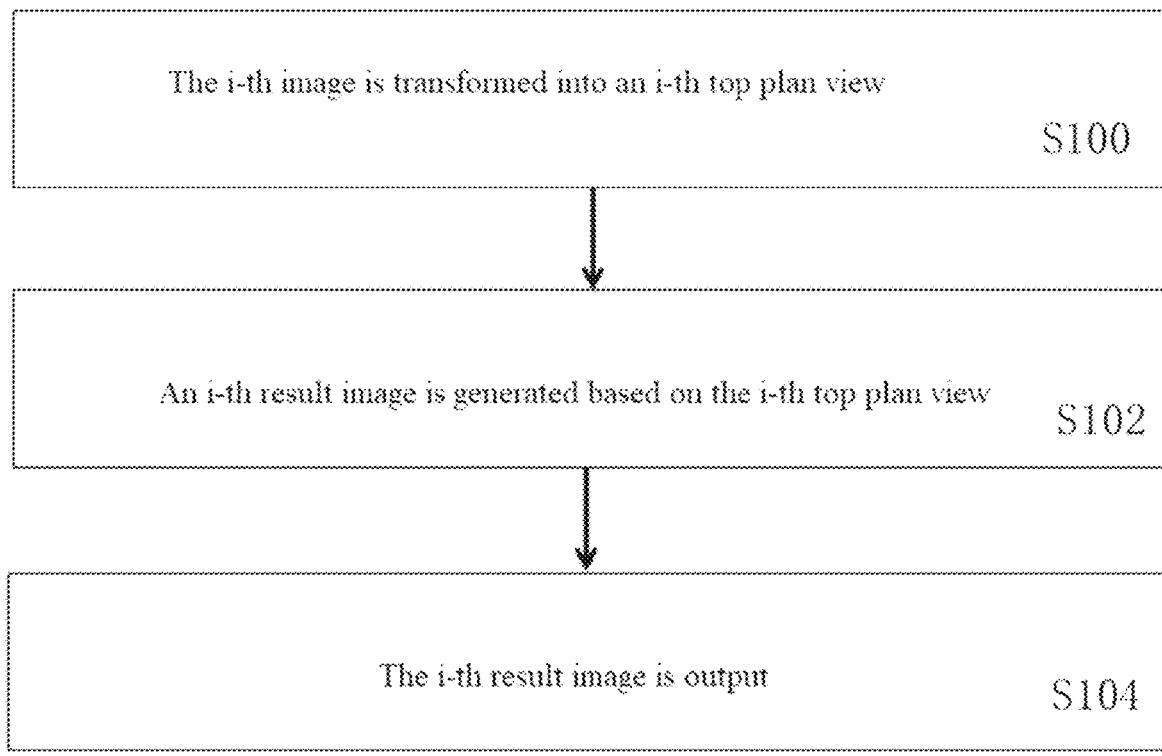
FIG. 1 is a flowchart of a reverse assist method according to an exemplary embodiment of the current disclosure.

FIG. 1 is a flowchart of a reverse assist method according to an exemplary embodiment of the current disclosure. As shown in FIG. 1, in step S100, the i-th image in a reversing direction acquired by the camera unit at time $T_i$ is transformed into an i-th top plan view, where i≥1. In this application, the top plan view is an image when viewed from top to bottom, which can also be called a bird's eye view.

As an example, the camera unit may be a camera unit provided on a vehicle, such as a camera or a video camera mounted on the vehicle for capturing an image of an external environment of the vehicle.

Alternatively, or in addition, the camera unit may also be an image acquisition device not mounted on the vehicle or an apparatus having an image acquisition function. Images captured by such device or apparatus are transmitted to a systems or device for executing the reverse assist method. Such image acquisition devices are, for example, commercially available cameras or video cameras, etc. This kind of device with image acquisition function can be a mobile phone, tablets with camera function etc. Those skilled in the art will understand that the transmission mentioned herein can be realized through a wireless network or through a line.

In step S102, an i-th result image is generated based on the i-th top plan view, wherein when i is greater than 1, the i-th top plan view and an intermediate image are spliced to generate an i-th result image. The intermediate image is an image of an outside environment in the reversing direction taken at a time earlier than time $T_i$. During reversing, the intermediate image is updated when a predetermined condition is met. The intermediate image may be stored in the storage section. The storage section may be a storage component provided in the vehicle, or may be a storage component provided in the system or device for executing the reverse assist method. The storage component is, for example, a semiconductor memory unit, a magnetic memory unit, an optical memory unit, etc., as long as it can be used to store data for other related components to access and/or store.

In step S104, the i-th result image is output. For example, output to an on-board display screen so that the user can view it to help the user more accurately perform the reversing operation.

The reverse assist method according to this example is executed during the vehicle reversing, and the view transformed from the image acquired at an earlier time is spliced into the current view to form a current result image, which adds part of the environment where the vehicle has passed in addition to the current view to the reverse image to be presented to the user. In this way, the driver can see a more comprehensive scene on the reversing path, which is helpful to eliminate blind areas.

According to the example of the current disclosure, at a time when i is equal to 1, that is, $T_1$, it is an initial time when the camera unit starts to acquire an image in the reversing direction after the reverse assist method is executed. The camera unit acquires a first image for the reverse assist method at time $T_1$. Further, the first image acquired by the camera unit at time $T_1$ is transformed into a first view, and in some examples of the current disclosure, a first result image is generated from the first view, and the first result image is used as a first frame intermediate image. Here, a first result image is generated from the first view, for example, the first view being used as the first image. The first frame intermediate image is stored in a suitable storage component so as to be spliced with subsequent views to generate a new result image.

According to some examples of the current disclosure, the intermediate image may be updated according to a predetermined condition. For example, the intermediate image is updated according to a predetermined movement displacement amount $\Delta S$, i.e., updated once every certain distance traveled. Alternatively, it is also possible to consider updating the intermediate image at predetermined time intervals. For example, the current intermediate image A is aligned with and spliced with a fourth view at time $T_4$, and the vehicle travels a distance of S, then when the vehicle moves to $S+\Delta S$, the intermediate image will be updated with the result image at the time when the corresponding vehicle travels to $S+\Delta S$, and when the vehicle travels to $S+2\Delta S$, the previous intermediate image will be updated with the result image at the time when the corresponding vehicle travels to $S+2\Delta S$ to form a new intermediate image, and so on, and is not enumerated again. For another example, the intermediate image is updated according to a predetermined time interval $\Delta t$. In this case, during reversing, once the moving time period satisfies $\Delta T$, the intermediate image is replaced by a result image at this time to form a new intermediate image. For example, at time $T_2$, a second view corresponding to this time is spliced with the intermediate image to form a second result image; at time $T_3$, a third view corresponding to this time is spliced with the intermediate image to form a third result image, . . . , and at time T2+ΔT, the view corresponding to this time (the (2+ΔT)-th view) and the intermediate image are spliced to form a result image corresponding to this time, that is, the (2+ΔT)-th result image; the (2+ΔT)-th result image replaces the intermediate image used in the previous process to form a new intermediate image for later use. It should be noted that when updating according to a predetermined time interval, the duration of the predetermined time interval ΔT is set such that the update frequency of the intermediate image is smaller than the generation frequency of the result image.

In the example of the current disclosure, the camera unit is preferably a monocular camera, also called a fisheye camera. According to the examples of this disclosure, only one monocular camera is employed, but there is no limitation that only one monocular camera can be used, and there is no limitation that only monocular cameras can be used. In the following example, a panoramic view taken by the monocular camera during vehicle reversing, that is, the original image, will be transformed into a top plan view. In this disclosure, during reversing, the reversing environment can be displayed to the driver and other relevant personnel. Compared with using multiple cameras, a monocular camera can obtain a panoramic image in the vehicle reverse path, and the functions otherwise to be achieved by multiple cameras are realized with less hardware cost, which is helpful for saving physical space and economic cost of the vehicle.

Figure 2A:
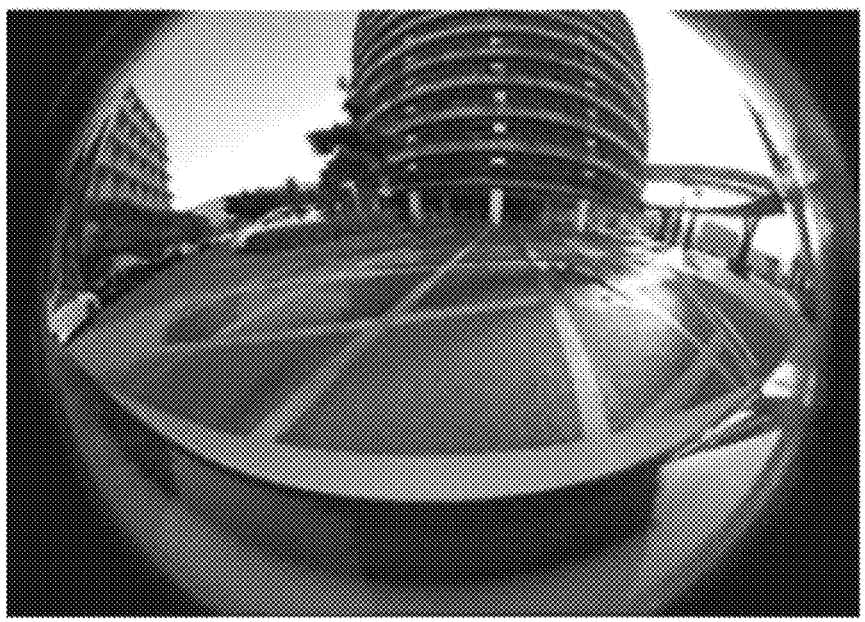
FIG. 2A is an exemplary original image in the reversing direction acquired by a monocular camera.
Figure 2B:
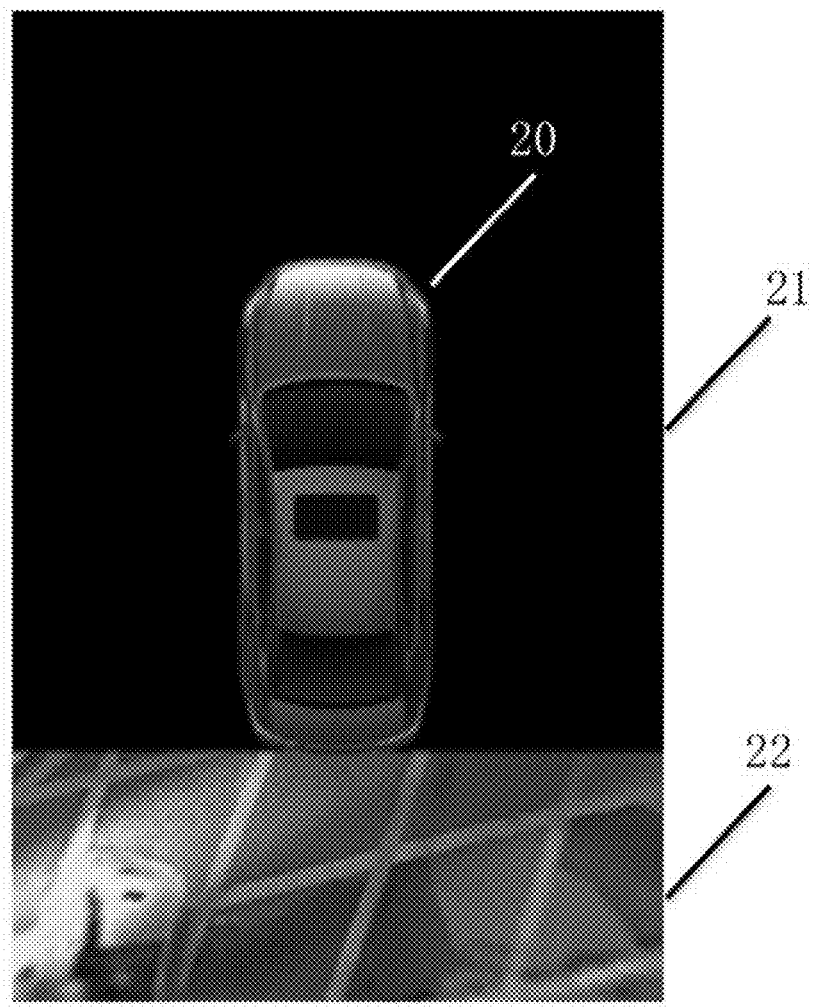
FIG. 2B is a top plan view generated from the original image of FIG. 2A.

FIG. 2A is an original image in the reversing direction acquired by a monocular camera as an example. FIG. 2B is a top plan view generated from the original image of FIG. 2A. The process of transforming the original image acquired by the monocular camera into the top plan view of FIG. 2B can be completed by the prior art, and only a simple description will be made here: obtaining an image of the vehicle. The original image obtained by the monocular camera is cropped or is performed distortion correction or the like to obtain a single view. Based on the camera unit's internal parameters, distortion parameters, external parameters, etc., the view is processed into a top plan view with a spliced vehicle. In this example, the area beyond the effective range of the camera in the top plan view is filled with black by default, for example. Referring to FIG. 2B, the portion labeled 22 is obtained from the original image (shown in FIG. 2A), the vehicle 20 is a spliced vehicle image, and the filled portion labeled 21 is a portion filled with black, for example, by default because the area is beyond the effective range of the camera as described above.

Figure 3:
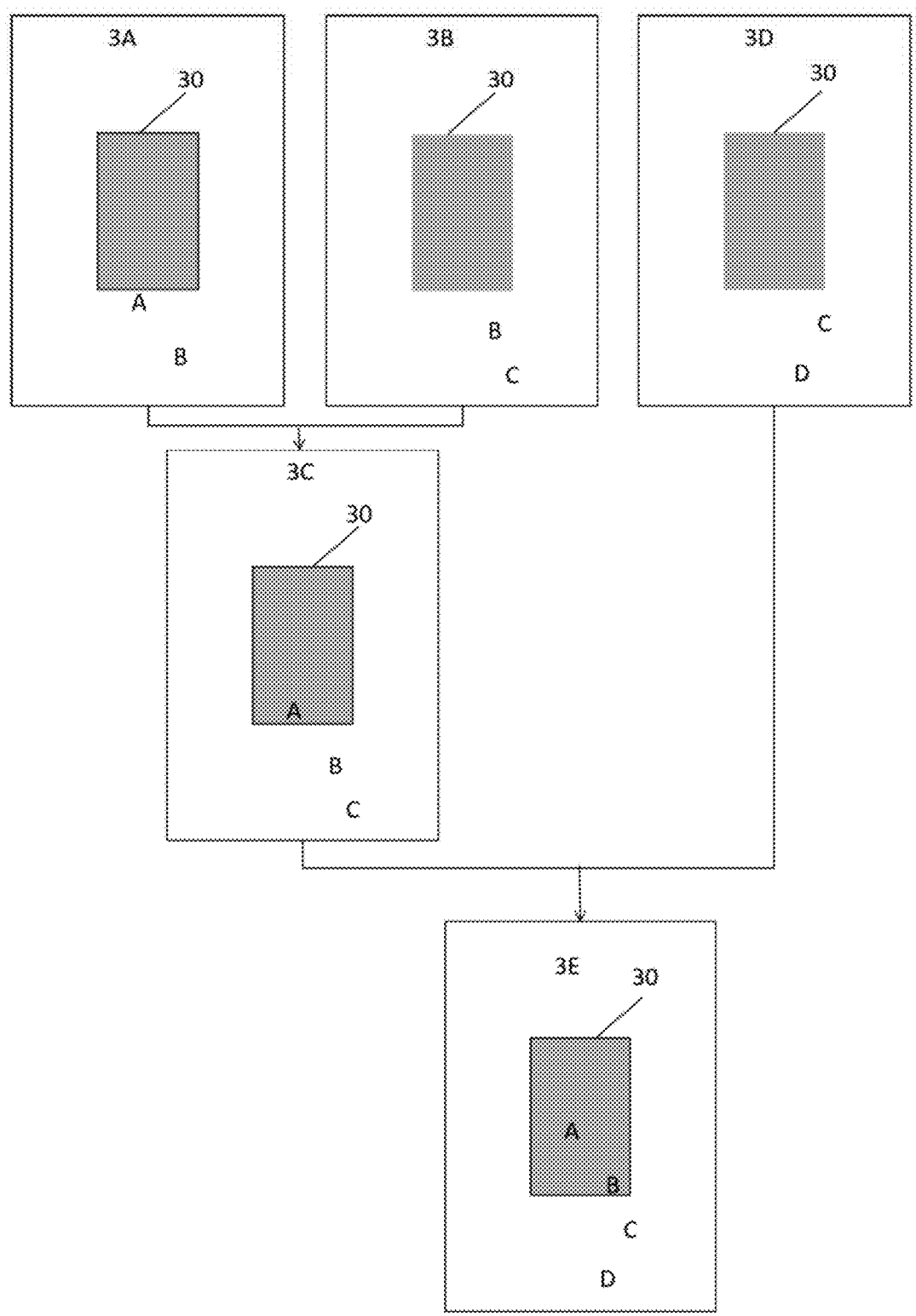
FIG. 3 schematically illustrates the process of generating a result image.

FIG. 3 schematically illustrates the process of generating a result image. The vehicle 30 in the images 3A to 3E shown in FIG. 3, and the road surface positions A, B, C, D encountered during reverse driving are all schematic, and are intended to explain the principle of generating a result image in the current disclosure, rather than limiting the vehicle, road surface, etc. In this example in conjunction with the images 3A to 3E of FIG. 3, we assume that the predetermined interval time for updating the intermediate image is the same as the interval time for the camera unit to acquire the image, that is, each current result image replaces the intermediate image of the previous time to become a new intermediate image, and is spliced with a view of the next time to become a result image of the next time. Note that this assumption is intended to explain the splicing process of the intermediate image and the view, and to explain how to update the intermediate image. Wherein, the image labeled 3A is a result image at time $T_i$, that is, the i-th result image, the image 3B is a view at time $T_{i+1}$, that is, the i+1-th view, and the image 3C is a view at time $T_{i+2}$, that is, the i+2-th view. It should be understood that the view is the top plan view transformed from the original image captured by the monocular camera.

The i-th result image of the image 3A is used as the intermediate image from which the positions A and B can be seen. The top plan view at time $T_{i+1}$, that is, the intermediate images shown in images 3B and 3A, is spliced to obtain a result image 3C. It can be seen that the vehicle 30 is driving in reverse, the position A is covered by the vehicle body when the vehicle drives to the environment shown in the image 3B. The intermediate image of the image 3A is spliced with the top plan view of the image 3B, and the result image 3C includes the road environment through which the vehicle travels from the environment of the image 3A to the environment of the image 3B, such as position A. The intermediate image is updated with the result image of the image 3B as a new intermediate image, and is spliced with the view at time $T_{i+2}$, i.e., the i+2 th view, obtained while the vehicle continues to drive, so as to obtain the i+2 th result image shown in the image 3E. Compared with the image 3C and the image 3D, the image 3E includes the road environment through which the vehicle travels from the environment of the image 3A to the environment of the image 3D, i.e., includes the information of the positions A, B, C and D.

From this, it can be seen that by splicing the intermediate image of the previous image with the currently obtained view, more comprehensive road information on the reversing path can be obtained, such as those positions that may be blocked by the vehicle.

According to some examples of the current disclosure, when the intermediate image is spliced with the current view to generate a corresponding result image, the spicing is based on a transformation matrix H. That is, the intermediate image is aligned and spliced with the i-th top plan view at the time $T_i$ based on the transformation matrix H to generate the i-th result view corresponding to the $T_i$ time. The transformation matrix H is related to the motion information of the vehicle in this disclosure. More specifically, the transformation matrix H is obtained based on the left and right wheel speeds of the vehicle, the time length between adjacent times, and a pixel width of the top plan view, and the actual physical length displayed by the pixel width of the top plan view.

The process of obtaining the transformation matrix H will be described below.

The transformation matrix is calculated and obtained based on the wheel speed of the vehicle and the information related to the top plan view. The wheel speed of the vehicle can be obtained by, for example, a wheel speed sensor. It should be noted that the top plan view to which the pixel width of the top plan view to be discussed below and the actual physical width displayed by the top plan view is related is any frame of the top plan view, because in this example, as to any one of the 1st, 2nd . . . i th, i+1 th . . . top plan views, its pixel width is the same as the actual physical width displayed. For example, a system or device for executing the reverse assist method obtains real-time wheel speeds $V_L$ and $V_R$ of the left rear wheel and the right rear wheel of the vehicle through a CAN bus. Assuming that the rear axle length of the vehicle is L, the time length between the previous time and the current time, that is, the time difference between $T_i$ and $T_{i-1}$ is dt, the pixel width of the top plan view generated from the image acquired by the camera is $W_{pixel}$, and the actual physical width displayed is $W_{world}$. The origin of the image coordinate system is located in the upper left corner, and the position of the rear axle center of the vehicle in the image coordinate system can be calculated and obtained according to the physical structure parameters of the vehicle, and is set to $(u_0, v_0)$.

When $V_L = V_R$, the vehicle is moving in a straight line. According to the vehicle kinematics model, when the movement distance $dis = V_L * dt$, the transformation matrix H of the top plan view from the previous time (time $T_{i-1}$) to the current time (time $T_i$) is shown in the following equation (1).

$$H = \begin{bmatrix} 1 & 0 & 0 \\ 0 & 1 & -dis * W_{pixel}/W_{world} \end{bmatrix} \quad (1)$$

Figure 4:
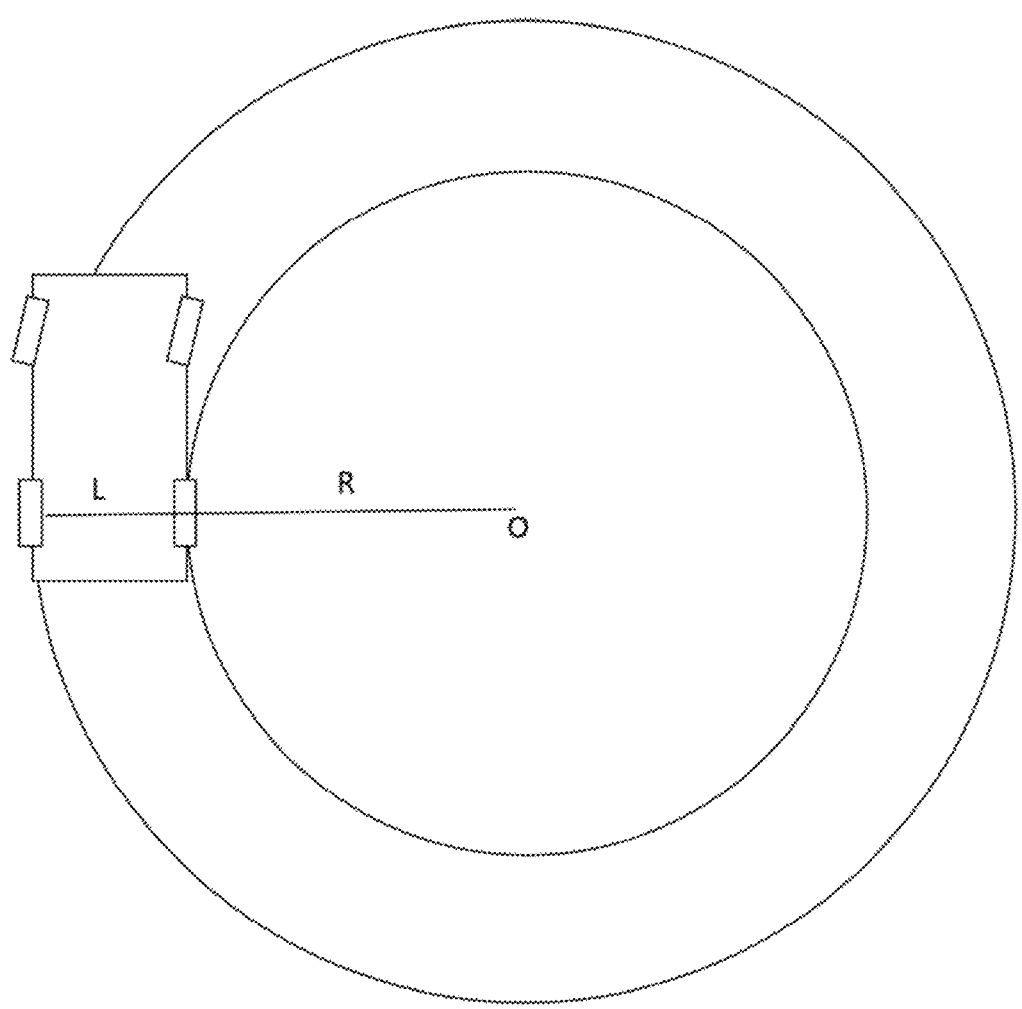
FIG. 4 is a schematic model of the vehicle when it is rotating to the right.

When $V_L > V_R$, the vehicle is rotating to the right. According to the vehicle kinematics model, the whole vehicle is moving circularly around a certain center. Referring to FIG. 4, let the radius of rotation of the right rear wheel be R and the angular velocity be w, $V_L(R+L) = V_R/R$ is satisfied, resulting in $R = (V_R)/(V_L - V_R) * L$, $w = V_R/R$. The rotation angle from the previous time ($T_{i-1}$ time) to the current time ($T_i$ time) is $\theta = w*dt$, the rotation center coordinate in the image coordinate system is $(u_o + (0.5*L+R)*W_{pixel}/W_{world}, v_o)$. At this time, the view equivalent to the previous time ($T_{i-1}$ time) is rotated around $(u_o + (0.5*L+R)*W_{pixel}/W_{world}, v_o)$ by $-\theta$, whereby the transformation matrix H is shown in Equation (2) below.

$$H = \begin{bmatrix} \cos\theta & -\sin\theta & (1-\cos\theta)*(u_o + (0.5*L+R)*W_{pixel}/W_{world}) + \sin\theta * v_o \\ \sin\theta & \cos\theta & -\sin\theta*(u_o + (0.5*L+R)*W_{pixel}/W_{world}) + (1-\cos\theta)*v_o \end{bmatrix} \quad (2)$$

Figure 5:
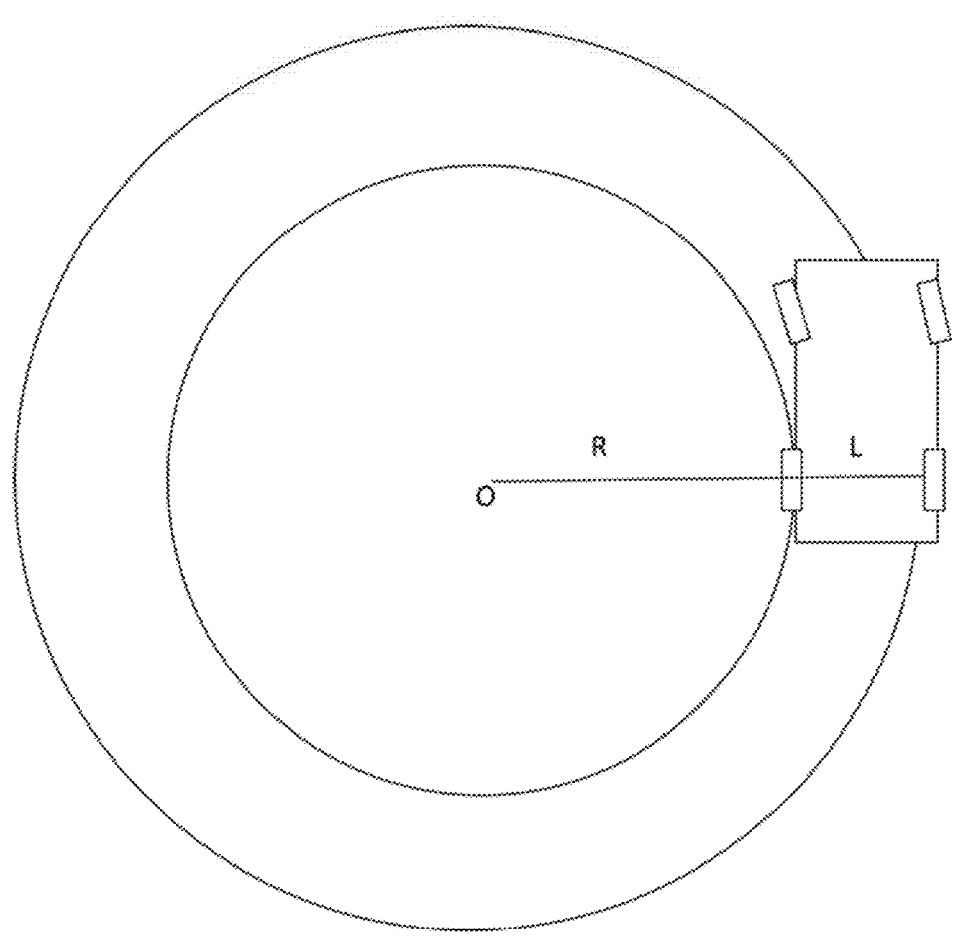
FIG. 5 is a schematic model of the vehicle when it is rotating to the left.

At that time $V_L < V_R$, the vehicle is rotating to the left. According to the vehicle kinematics model, the whole vehicle is making a circular motion around a certain center. Referring to FIG. 5, let the rotation radius of the left rear wheel be R, the angular velocity be w, and $V_R/(R+L) = V_L/R$ is satisfied, resulting in $R = (V_L)/(V_R - V_L)*L$, $w = V_L/R$. The rotation angle from the previous time ($T_{i-1}$ time) to the current time ($T_i$ time) is $\theta = w*dt$, the rotation center coordinate in the image coordinate system is $(u_o - (0.5*L+R)*W_{pixel}/W_{world}, v_o)$. At this time, when the top plan view corresponding to the previous time (time $T_{i-1}$) rotates $-\theta$, the transformation matrix H is shown in equation (3).

$$H = \begin{bmatrix} \cos\theta & -\sin\theta & (1-\cos\theta)*(u_o - (0.5*L+R)*W_{pixel}/W_{world}) + \sin\theta * v_o \\ \sin\theta & \cos\theta & -\sin\theta*(u_o - (0.5*L+R)*W_{pixel}/W_{world}) + (1-\cos\theta)*v_o \end{bmatrix} \quad (3)$$

The above description elaborates the process of obtaining the transformation relation H under three conditions, namely, straight driving, right rotating and left rotating of the vehicle.

The transformation matrix H is obtained, and the intermediate image can be translated and rotated accordingly, so as to be aligned with the current view generated from the image captured by the monocular camera, and spliced into the current view according to the alignment relation to generate the current result image.

According to the example of the current disclosure, the intermediate image is not updated (i.e. updated once) every time a result image is acquired, but is updated according to predetermined conditions, e.g. according to a predetermined movement displacement amount, i.e. updated once every certain distance traveled. For example, the current intermediate image A is aligned and spliced with the fourth view at time $T_4$, for example, to form a fourth result image; When the fifth view at time $T_5$ arrives, the intermediate image A is aligned and spliced with the fifth view to form a sixth result image, . . . when the vehicle has moved by a predetermined movement displacement $\Delta S$ since time T4, assuming that this time is time $T_m$, when the m-th view corresponding to $T_m$ arrives, the intermediate image A is still aligned and spliced with the m-th view to form the m-th result image, and the m-th result image replaces the intermediate image to become a new intermediate image A' (where m is a specific value of i); when the m+1 th view at time $T_{m+1}$ arrives, the new intermediate image A' and the m+1 th view will be aligned and spliced to form the m+1 th result image. Then when the vehicle moves another $\Delta S$ from $T_m$, the corresponding result image will be used to replace the intermediate image A' again to generate a new intermediate image, and so on. By updating the intermediate image according to a predetermined condition, the image of the environment of the road surface through which the vehicle has traveled can be displayed in the result image to be presented to the user later, and the calculation amount is also reduced. Moreover, such a setting is also helpful to avoid blurring of the result image caused by very frequently updating the intermediate image. The intermediate image is first aligned with the current view based on the transformation matrix, and then spliced into the current view. This operation here includes translation and rotation. Since the number of pixel units is distributed discretely rather than continuously, the alignment operation means that the aligned image includes interpolation operation on the pixel values of the spliced new image, which will bring some blurring phenomenon. If the intermediate image is updated as soon as there is a result image, for example, the blurring phenomenon as many as the number of updates will be accumulated as the traveling distance increases, resulting in more and more blurring of the image presented to the user. However, if the number of updates of the intermediate image is reduced as in the current disclosure, the accumulation of blur phenomena can be reduced and a better image can be presented.

Figure 6:
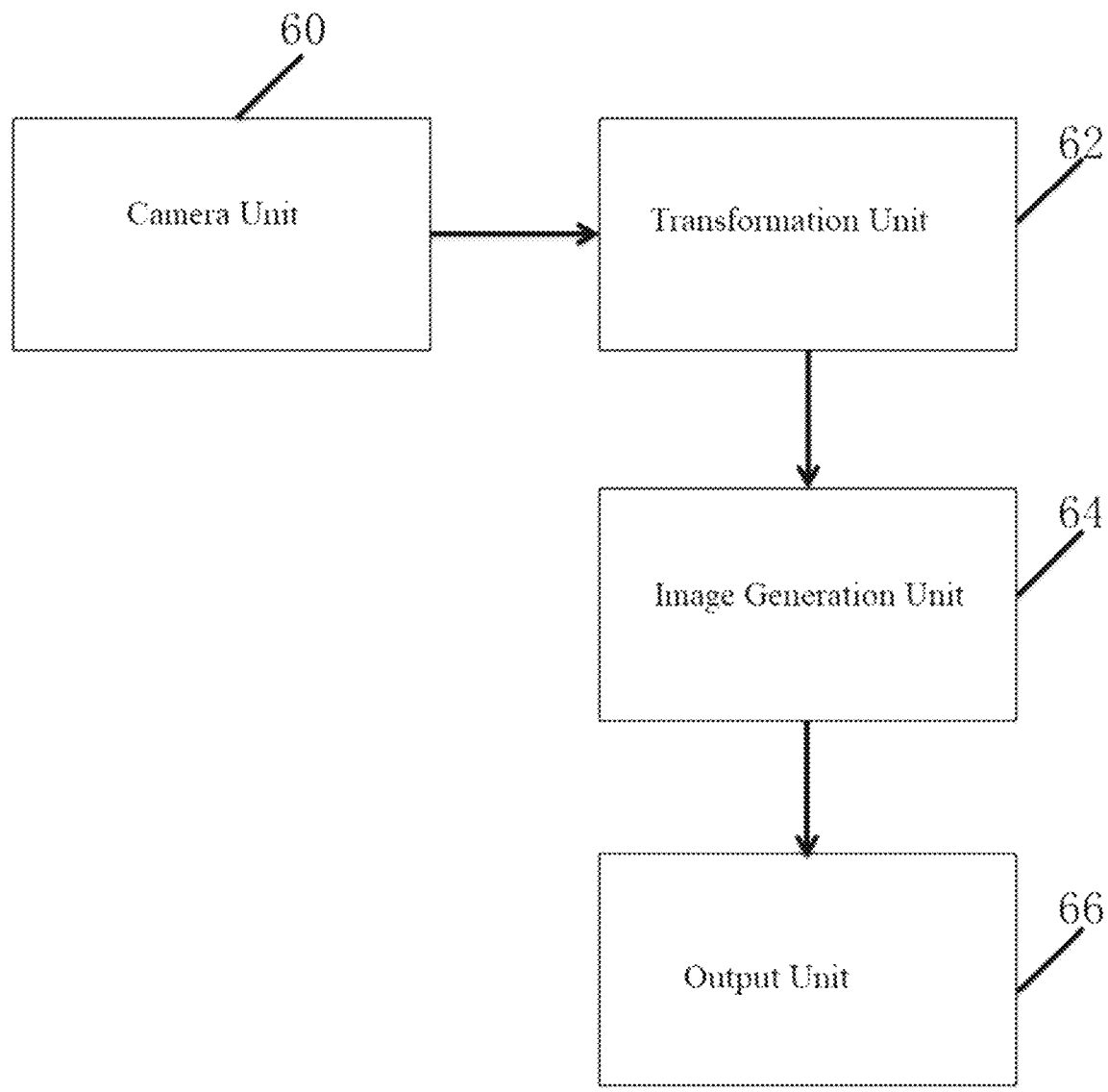
FIG. 6 is a structural diagram of a reverse assist system according to an exemplary embodiment of the current disclosure.

FIG. 6 is a schematic structural diagram of a reverse assist system according to an exemplary embodiment. As shown in the figure, the system includes a transformation unit 62, an image generation unit 64, and an output unit 66. The transformation unit 62 transforms the i-th image in the reversing direction acquired by the camera unit 60 at time Ti into an i-th top plan view, where i≥1. The image generation unit 64 generates an i-th result image according to an i-th top plan view, wherein when i is greater than 1, the i-th top plan view is spliced with an intermediate image acquired from the storage section to generate the i-th result image. The output unit 66 outputs the i-th result image. The intermediate image is a view transformed from an image of the outside environment in the reversing direction acquired by the camera unit 60 at a time earlier than for example, and is stored in a storage section (not shown). The storage section may be part of the image processing unit 64, that is, the image processing unit 64 is configured with the storage section. Alternatively, or in addition, the storage section may be a storage device independent of the image processing unit 64. The image processing unit 64 is further configured to update the intermediate image with the corresponding result image under the condition that a predetermined condition is satisfied during reversing. In the example of the current disclosure, without limitation, updating the intermediate image with the result image is to replace the intermediate image with the result image to be used as a new intermediate image.

The camera unit 60 in this example, like the camera unit described above in connection with the example of FIG. 1, may be a camera unit mounted on a vehicle, or may be an image acquisition device not mounted on the vehicle or an apparatus having a photographing function, which will not be described again. In addition, in this disclosure example, the camera unit 60 is a monocular camera, so in the following, sometimes the monocular camera 60 is directly substituted for the camera unit 60.

The transformation unit 62 can transform the original image in the reversing direction captured by the camera unit 60 into a top plan view such as a top plan view for example seen from above according to the prior Art. The panoramic image captured by the monocular camera 60 is transformed into the top plan view, and the process is briefly described as follows: the panoramic image is subjected to processing such as cropping or distortion correction to obtain a single view; based on the camera unit's internal parameters, distortion parameters, external parameters, etc., the view is processed into a top plan view with the spliced vehicle. In this example, the area beyond the effective range of the camera in the top plan view is filled with black by default, for example. The image before transformation and the view after transformation can be understood with reference to FIGS. 2A and 2B. It should be noted that the transformation unit 62 may be a processing device external to the camera unit 60 or a processor integrated in the camera unit 60, such as the processor of the camera unit 60 itself. For example, the transformation function of the transformation unit 62 can also be implemented in a software, and the function is loaded into the camera unit 60 and executed by its processor, which is equivalent to implementing the transformation unit 62 in the processor of the camera unit 60.

In some examples, the image generation unit 64 takes the first view as a first result image and stores the first result image as a first frame intermediate image when i is equal to 1. It should be understood that when the storage section is part of the image generation unit 64, the image generation unit 64 stores the first result image in its storage section as an intermediate image; when the storage section is a storage device independent of the generation unit 64, the first result image is transferred to the storage section.

In other examples, the image generation unit 64 is further configured to update the intermediate image with the corresponding result image to be used as a new intermediate image when at least one of the predetermined time interval and the predetermined displacement amount is satisfied. The predetermined time interval $\Delta T$ and the predetermined displacement amount $\Delta S$ as well as updating the intermediate image according to them, have been described above and will not be described again.

The image generation unit 64 is further configured to generate a transformation matrix H according to the motion information of the vehicle and the information related to the top plan view, and to align the intermediate image with the i-th top plan view and splice the i-th top plan view and the intermediate image aligned with the i-th top plan view based on the transformation matrix to generate the i-th result image corresponding to the $T_i$ time. The motion information of the vehicle comes from the wheel speed sensors of the left and right rear wheels of the vehicle or other components or systems that can provide the required motion information. The calculation process of the transformation matrix H has been described above and will not be described again.

As an example, the image generation unit 64 may be implemented in the camera unit 60 or in a system cooperating with a reverse assist system in a vehicle, such as a processor in an integrated drive assist system in a vehicle, etc., or a vehicle electronic control unit (VCU) of the vehicle, etc.

It should be noted that the image generation unit 64 and the transformation unit 62 may be implemented in the same component. For example, the same processor is configured to realize the functions of the image generation unit 64 and the transformation unit 62. In some examples, it may be a processor within the camera unit 60. In some examples, it can be implemented in a system that cooperates with a reverse assist system in a vehicle, such as a processor in an integrated drive assist system in the vehicle, etc., or a VCU of a vehicle, etc.

The output unit 66 outputs the generated result image. Here, the output unit 66 may be a display unit or an interface for data communication with the display unit. For example, the output unit 66 is a display unit such as a display screen, and displays the result image to the user for viewing. In another example, the output unit transmits the generated image data to a display unit built in the vehicle, such as a central control screen, etc. In this case, the output unit is the output interface.

The reverse assist system according to the example of the current disclosure can be implemented entirely by using the existing components of the vehicle, such as a camera for reversing images of the user mounted on the vehicle, a processor in the existing driving assist system of the vehicle, etc. to realize the functions of the transformation unit and/or the image processing unit, and display the result image to the user through the existing display unit of the vehicle.

An example according to the present disclosure also provides an image processor. The image processor is connected with a camera unit to acquire images from the camera unit. The camera unit is similar to the camera unit described in the above examples. The image processor includes a processing section and a storage section. The processing section is configured to receive an i-th image in the vehicle reversing direction acquired from the camera unit at time $T_i$, transform the acquired i-th image into an i-th top plan view, and generate an i-th result image from the i-th top plan view. The storage section is used for storing data needed in the processing process of the processing section. In this example, i≥1, and the processing section is further configured to splice the i-th top plan view with the intermediate image acquired from the storage section to generate the i-th result image when i is greater than 1, and to send the corresponding result image to the storage section to update the stored intermediate image when the predetermined condition is satisfied. The intermediate image is a view transformed from an image of an outside environment in the reversing direction acquired at a time earlier than $T_i$.

In some examples, the processing section of the image processor is configured to generate a transformation matrix according to the motion information of the vehicle, and to align the intermediate image with the i-th top plan view and splice the i-th top plan view and the intermediate image aligned with the i-th top plan view based on the transformation matrix to generate the i-th result image corresponding to the $T_i$ moment.

It should be noted that in the example of the image processor, the processing section is configured to realize the functions of the transformation unit and the image processing section as described above in connection with FIG. 6, except in the case where the image processing section itself includes a storage section. When the image processing section itself includes the storage section, the processing section realizes functions other than storage while the storage section realizes the storage function. Since the examples suitable for the transformation unit and the image processing section are also suitable for the image processor, the description will not be repeated.

According to some examples of the current disclosure, a storage medium is also included. The storage medium stores instructions that, when executed by a computer, can implement the reverse assist method described above. The computer can be, for example, an existing processor of the vehicle, or an on-board processing device, etc.

According to some examples of the current disclosure, a drive assist system is also provided. The drive assist system is configured to be able to execute the reverse assist method described above. Alternatively, the drive assist system includes the reverse assist system described above. Alternatively, the drive assist system includes the image processor described above.

The application also provides a vehicle. It is capable of executing the reverse assist method described above, or includes the reverse assist system described above, or includes the image processor described above.

In all of the above examples, when the camera unit is mounted on the vehicle, it is preferably an imaging device mounted on the rear of the vehicle for taking a reverse image. When the camera unit is not mounted on the vehicle, Then it should be placed in a position where the image in the reverse direction of the vehicle can be taken as the preferred position.

In all the above examples, the user may be a driver of the vehicle or a passenger, and in the case where the vehicle is an autonomous vehicle or drives by remote operation, the user is the person who controls the vehicle.

The reverse assist method for a vehicle exemplarily provided in this application can be implemented in an on-board reverse or parking assist system with an imaging device, or a drive assist system, or can also be implemented by the reverse assist driving system provided in this application.

In the examples herein, the term "view" also refers to images, and the use of "view" is intended to distinguish it from images used in the context.

As mentioned above, executing the reverse assist method given in this disclosure, or adopting a reverse assist system or an image processor or the like according to examples of this disclosure, can enable a user to obtain a road surface environment through which the vehicle travels during reversing, thereby avoiding blind spots when reversing. At the same time, the intermediate image is updated according to a predetermined condition, which reduces the calculation amount and decreases the blurring of the output image.

The above-mentioned examples only represent several embodiments of the current disclosure, and their descriptions are more specific and detailed, but they should not be construed as limiting the scope of the disclosure. It should be pointed out that for those skilled in the art, several modifications and improvements can be made without departing from the concept of the current disclosure, which are all within the scope of protection of the current disclosure. Therefore, the protection scope of the patent of the current disclosure shall be subject to the appended claims.

What is claimed is:

1. A reverse assist method for a vehicle, comprising:
   transforming an i-th image in a reversing direction acquired by a camera unit at time $T_i$ into an i-th top plan view, wherein a top plan view is also called a bird's eye view and $i \geq 1$;
   generating an i-th result image based on the i-th top plan view, wherein when i is greater than 1, the i-th top plan view and an intermediate image are spliced to generate an i-th result image;
   outputting the i-th result image;
   wherein the intermediate image is a view transformed from an image of an outside environment in the reversing direction acquired at a time earlier than $T_i$ wherein when i is greater than 1, and the intermediate image is updated according to a predetermined condition during reversing; and
   wherein splicing the i-th top plan view and the intermediate image to generate the i-th result image comprising:
   aligning the intermediate image with the i-th top plan view based on a transformation matrix obtained according to motion information of the vehicle and parameters related to the top plan view;
   splicing the i-th top plan view and the intermediate image aligned with the i-th top plan view to generate the i-th result image corresponding to the time $T_i$.

2. The reverse assist method of claim 1, wherein the transformation matrix is obtained based on left and right wheel speeds of the vehicle, a time length between adjacent times, a pixel width of the top plan view image, and an actual physical length displayed by the pixel width of the top plan view.

3. The reverse assist method of claim 1, wherein the generated i-th result image based on the i-th top plan view further comprises generating a first result image from a first view when i is equal to 1, and taking the first result image as a first frame intermediate image.

4. The reverse assist method of claim 1, wherein the predetermined condition is a movement displacement amount, and updating according to the predetermined condition is to update the intermediate image with a corresponding result image, that is, to make the result image become the intermediate image when the movement displacement amount is satisfied.

5. The reverse assist method of claim 1, wherein the predetermined condition is a predetermined time interval, and the updating according to the predetermined condition is to update the intermediate image with the corresponding result image, that is, to make the result image become the intermediate image when the predetermined time interval is satisfied.

6. The reverse assist method of claim 1, wherein the camera unit is a monocular camera, the i-th image is an i-th panoramic image acquired by the monocular camera, and the i-th top plan view is an i-th top plan view transformed from the i-th panoramic image.

7. A reverse assist system for a vehicle, comprising:
a transformation unit configured to transform an i-th image in a reversing direction acquired by a camera unit at time $T_i$ into an i-th top plan view, wherein a top plan view is also called a bird's eye view and i≥1;
an image generation unit configured to generate an i-th result image according to the i-th top plan view, wherein when i is greater than 1, the i-th top plan view is spliced with an intermediate image acquired from a storage section to generate the i-th result image;
an output unit for outputting the i-th result image;
wherein the intermediate image is a view transformed from an image of an outside environment in the reversing direction acquired at a time earlier than $T_i$ wherein when i is greater than 1;
wherein the image generation unit is further configured to align the intermediate image with the i-th top plan view based on a transformation matrix obtained according to motion information of the vehicle and parameters related to the top plan view; and
splice the i-th top plan view and the intermediate image aligned with the i-th top plan view to generate the i-th result image corresponding to the time $T_i$.

8. The image generation unit of claim 7 is further configured to update the intermediate image with a corresponding result image when the predetermined condition is satisfied during reversing.

9. The reverse assist system of claim 7, wherein the image generation unit is configured to generate a transformation matrix according to motion information of the vehicle and parameters related to the top plan view, aligns the intermediate image with the i-th top plan view based on the transformation matrix, and splice the i-th top plan view and the intermediate image aligned with the i-th top plan view to generate the i-th result image corresponding to time $T_i$.

10. The reverse assist system of claim 7, wherein the image generation unit is configured to generate a first result image from a first view when i is equal to 1, and transfer the first result image to a storage section as a first frame intermediate image.

11. The reverse assist system of claim 7, wherein the image unit is configured to update the intermediate image with the corresponding result image, that is, to make the result image become the intermediate image, when the movement displacement amount as the predetermined condition is satisfied during reversing.

12. The reverse assist system of claim 7, wherein the image unit is configured to update the intermediate image with the corresponding result image, that is, to make the result image become the intermediate image, when a predetermined time interval as the predetermined condition is satisfied during reversing.

13. The reverse assist system of claim 7, wherein the i-th image in the reversing direction acquired by the camera unit at time $T_i$ is an i-th panoramic image acquired by a monocular camera which is used as the camera unit, and the transformation unit is configured to transform the i-th panoramic image into the i-th top plan view.

14. An image processor connected to a camera unit to acquire an image from the camera unit comprising:
a processing section configured to receive an i-th image in the vehicle reversing direction acquired from the camera unit at time $T_i$, transform the acquired i-th image into an i-th top plan view, and generate an i-th result image from the i-th top plan view wherein a top plan view is also called a bird's eye view;
a storage section for storing data required during processing of the processing section; and
where i≥1, and the processing section is further configured to splice the i-th top plan view and the intermediate image acquired from the storage section to generate the i-th result image when i is greater than 1, and to send the corresponding result image to the storage section to update the stored intermediate image when a predetermined condition is satisfied;
wherein the intermediate image is a view transformed from an image of an outside environment in a reversing direction acquired at a time earlier than $T_i$ wherein when i is greater than 1; and
wherein the processing section is further configured to align the intermediate image with the i-th top plan view based on a transformation matrix obtained according to motion information of the vehicle and parameters related to the top plan view; and
splice the i-th top plan view and the intermediate image aligned with the i-th top plan view to generate the i-th result image corresponding to the time $T_i$.

15. The image processor of claim 14, wherein the processing section is configured to generate a transformation matrix based on the motion information of the vehicle, and to align the intermediate image with the i-th top plan view and to splice the i-th top plan view and the intermediate image aligned with the i-th top plan view to generate the i-th result image corresponding to the time $T_i$ based on the transformation matrix.

16. A non-transitory storage medium stores instructions that executed by a computer, implements a reverse assist method comprising:
transforming an i-th image in a reversing direction acquired by a camera unit at time $T_i$ into an i-th top plan view, wherein a top plan view is also called a bird's eye view and i≥1;
generating an i-th result image based on the i-th top plan view, wherein when i is greater than 1, the i-th top plan view and an intermediate image are spliced to generate an i-th result image;
outputting the i-th result image;
wherein splicing the i-th top plan view and the intermediate image to generate the i-th result image comprising:
aligning the intermediate image with the i-th top plan view based on a transformation matrix obtained according to motion information of the vehicle and parameters related to the top plan view;
splicing the i-th top plan view and the intermediate image aligned with the i-th top plan view to generate the i-th result image corresponding to the time $T_i$; and
wherein the intermediate image is a view transformed from an image of an outside environment in the reversing direction acquired at a time earlier than $T_i$ wherein when i is greater than 1, and the intermediate image is updated according to a predetermined condition during reversing.

17. A drive assist system comprising a reverse assist system which further comprising:
a transformation unit configured to transform an i-th image in a reversing direction acquired by a camera unit at time $T_i$ into an i-th top plan view, wherein a top plan view is also called a bird's eye view and i≥1;
an image generation unit configured to generate an i-th result image according to the i-th top plan view, wherein when i is greater than 1, the i-th top plan view is spliced with an intermediate image acquired from a storage section to generate the i-th result image wherein when i is greater than 1;

an output unit for outputting the i-th result image; and
wherein the image generation unit is further configured to
   align the intermediate image with the i-th top plan view based on a transformation matrix obtained according to motion information of the vehicle and parameters related to the top plan view; and
splice the i-th top plan view and the intermediate image aligned with the i-th top plan view to generate the i-th result image corresponding to the time $T_i$.

* * * * *